United States Patent [19]

Streckert et al.

[11] Patent Number: 5,667,224

[45] Date of Patent: Sep. 16, 1997

[54] ADJUSTABLE SEAL ASSEMBLY

[75] Inventors: Holger H. Streckert, San Diego; Richard D. Kantner, La Jolla, both of Calif.

[73] Assignee: General Atomics, San Diego, Calif.

[21] Appl. No.: 649,947

[22] Filed: May 14, 1996

[51] Int. Cl.[6] .................................................. F16J 15/50
[52] U.S. Cl. ........................ 277/3; 277/147; 277/212 R; 277/212 F; 277/212 FB; 277/188 R; 277/227; 277/230; 277/235 R; 220/402; 220/403
[58] Field of Search .............................. 277/30, 128, 147, 277/212 R, 212 F, 212 FB, 188 R, 227, 230, 235 R; 220/402, 403

[56] References Cited

U.S. PATENT DOCUMENTS

| | | | |
|---|---|---|---|
| 2,784,989 | 3/1957 | Krupp | 285/236 |
| 2,920,908 | 1/1960 | Mitchell | 285/53 |
| 3,416,819 | 12/1968 | Day | 285/302 |
| 3,722,506 | 3/1973 | McMillan | 128/2.08 |
| 3,856,335 | 12/1974 | Blake | 285/286 |
| 3,934,480 | 1/1976 | Nederlof | 74/18.2 |
| 4,795,166 | 1/1989 | Irmler | 277/1 |
| 5,486,010 | 1/1996 | Hamilton et al. | 277/1 |

OTHER PUBLICATIONS

*Machine Design*, "Seals" pp. 63–64.

*Primary Examiner*—William A. Cuchlinski, Jr.
*Assistant Examiner*—Christina Annick
*Attorney, Agent, or Firm*—Fitch, Even, Tabin & Flannery

[57] ABSTRACT

An adjustable seal assembly for maintaining a fluid tight seal in a vacuum vessel is provided. The disclosed adjustable seal assembly is particularly suited for sealing a vessel that includes two concentrically disposed sections having a small gap therebetween such that the vessel accommodates relative axial motion between the chamber section and the closure section. The disclosed adjustable seal assembly is comprised of a thin, fiber reinforced polymeric membrane having a first edge attached to a surface of one section of the vessel along the entire perimeter thereof and a second edge attached to a surface of the other section of the vessel thereby sealing the gap between the sections of the vessel. The body of the thin membrane is further disposed such that it generally forms an axially adjustable loop configuration within the small gap allowing the two sections of the vessel to move without breaking the seal. The adjustable seal assembly further includes one or more guide mechanisms of various configurations attached to the sections of the vessel to guide the relative axial motion of the vessel sections.

22 Claims, 5 Drawing Sheets

ADJUSTABLE SEAL ASSEMBLY

BACKGROUND OF THE INVENTION

The present invention relates to an adjustable seal assembly for maintaining a fluid tight seal in a vessel, and more particularly, to a method and apparatus for forming an adjustable seal between two sections of a vacuum vessel wherein the adjustable seal is adapted to withstand relative axial motion between the two sections of the vessel.

Most vacuum vessels in use today are made of metal or composite materials. Where it is necessary to maintain an adjustable seal or adjustable boundary between a vacuum chamber of the vessel and an area of atmospheric or other non-vacuum pressure, such vacuum vessels that are made of metal typically utilize a metallic bellows formed between two sections of the vessel. The metallic bellows functions as the adjustable boundary between the vacuum portion and non-vacuum portion because the metallic bellows is adapted to move in a prescribed direction, i.e. an axial direction, through the accordion type movement of the bellows. This axial movement allows for the displacement of one section of the vessel relative to the second section of the vessel. Typically, the metallic bellows is easily attached to both sections of a metal vessel and thus forms an adjustable yet fluid tight seal between the vacuum portion of the vessel and the non-vacuum portion.

Where the vessel is fabricated from a composite material, as is the case for selected vessels in electron microscopes, satellites, and other airborne vehicles, the use of a metallic bellows is not always feasible. This is due primarily to the different materials used in the construction of the metallic bellows and the composite vessel which ultimately affects the reliability and maintainability of the vessel. For example, the use of a metallic bellows within a composite vessel presents certain difficulties in forming a fluid tight attachment between the metal bellows and composite sections of the vessel during the vessel fabrication process.

An alternate form of an adjustable seal is the rolling seal or rolling diaphragm as disclosed in several related patents. For example, in U.S. Pat. No. 3,722,506 issued Mar. 27, 1973 (McMillian, Jr.), there is shown a U-shaped rolling seal adapted for use between a piston and cylinder in a spirometer. As disclosed, this U-shaped rolling seal can only be used with devices having a circular shape or cross-section. In addition, the disclosed U-shaped rolling seal is not suited for use within vacuum vessels or other devices where the adjustable seal encounters moderately high forces. More importantly, the disclosure specifically avoids using any fibers or reinforcing material in the U-shaped rolling seal due to concerns of friction or hysteresis during movement of the rolling seal.

An alternative form of an adjustable seal is disclosed in U.S. Pat. No. 3,856,335, issued Dec. 24, 1974 (Blake). This related art reference discloses a rolling annular diaphragm which forms a fluid-tight slip joint between two casing members for absorbing shock energy between through the rolling movement of the annular diaphragm. Yet another rolling diaphragm seal between two parts adapted to move relative to one another is disclosed in U.S. Pat. No. 3,934,480, issued Jan. 27, 1976 (Nederlof). As with the other described related art, this particular rolling diaphragm seal is only suited for use with a piston and cylinder combination or other annular shaped cooperating parts. See also U.S. Pat. No. 2,920,908 issued Jan. 12, 1960 (Mitchell) which shows an annular seal made of Neoprene synthetic rubber for sealing the region between the exterior surface of a pipeline and a surrounding cylindrical casing, and U.S. Pat. No. 3,416,819 issued Dec. 17, 1968 (Day) which utilizes a silicon rubber elastomer as part of an assembly to seal a transition region between two pipes thereby creating a fluid-tight joint regardless of relative axial movement of the two pipes.

None of the aforementioned related art seals, however, are adapted for use in non-circular devices or vessels. In addition, none of the aforementioned related art seals are suitable for use in a vacuum environment, high purity environment, or other stringent environment especially where there is only a very thin gap between the moving components. What is needed therefore, is an adjustable seal assembly that can be used in vessels of circular as well as non-circular cross sections. More importantly, there is needed a very thin adjustable seal assembly suitable for use in a vacuum vessel or any other vessel where the seal is subjected to moderately high pressure differences and other stringent environments.

SUMMARY OF THE INVENTION

The present invention addresses the above-mentioned problems by providing an adjustable seal assembly for maintaining a fluid tight seal in vacuum vessels of various configurations. The presently disclosed adjustable seal assembly is particularly suited for sealing a vessel that includes a chamber section having an opening and a lid or closure section concentrically or coaxially disposed with respect to the chamber section proximate the opening. The vessel also maintains a generally small gap between the lid or closure section and the chamber section such that the vessel accommodates relative axial motion between the chamber section and the closure section. The presently disclosed adjustable seal assembly is comprised of a thin membrane having a first edge attached to a surface of the closure section of the vessel along the entire perimeter thereof. The other edge of the thin membrane is attached to a surface of the chamber section of the vessel thereby sealing the gap between the closure section and the chamber section of the vessel. The disclosed adjustable seal assembly further includes one or more guide mechanisms attached to the closure section and chamber section of the vessel to control the aforementioned relative axial motion. The adjustable seal also includes a flat segment of the thin membrane that generally forms a loop configuration within the small gap during the relative axial motion between the closure section and the chamber section of the vessel.

In one embodiment of the disclosed invention, the guide mechanisms of the adjustable seal assembly are fixedly attached to the closure section of the vessel and slidingly engaged with the chamber section of the vessel to guide the relative axial motion. In a second embodiment, the guide mechanisms of the adjustable seal assembly are fixedly attached to the chamber section of the vessel while slidingly engaged with the closure section of the vessel in order to guide the relative axial motion. In both embodiments, the guide mechanisms include an actuating means and a means for controlling the amount of axial displacement allowed between the closure section and the chamber section of the vessel.

Advantageously, the presently disclosed adjustable seal assembly is suitable for use on vacuum vessels of various shapes where the chamber section and closure section of the vessel are concentrically or coaxially disposed with respect to one another. The concentrically or coaxially disposed sections of the vessel generally form a small gap between the outer surface of one section and the corresponding inner surface of the other section which requires a thin yet fluid-tight seal. The adjustable seal assembly, disclosed herein, is particularly useful when used with non-circular vacuum vessels in that the adjustable seal assembly maintains a vacuum seal proximate corners of the non-circular vessel sections while tolerating relative axial movement of the vessel sections.

The thin membrane of the disclosed adjustable seal assembly is preferably constructed using a reinforced polymeric membrane. The reinforced polymeric membrane consists of a layer of a polymeric material, such as a polyaramide film or polyethylene film which is reinforced with a collection of continuous fibers, chopped fibers, whiskers, or platelets. The preferred reinforcement consists of a webbing or mesh of continuous fiber material that is attached to the layer of polymeric material. Alternatively, the reinforced polymeric membrane may include a unitary structure of polymeric material having one or more of the reinforcing materials embedded therein. In the fiber reinforcement embodiments, the preferred fibers are selected from the many different families or classifications of fibers. For example, the fiber reinforcement may include glass fibers, refractory material, such as carbon fibers, ceramics (e.g. silicon carbide fibers), polymers and polymer alloys, metal oxides, metal fibers, and various other fibers made of similar such materials.

One advantageous feature of a continuous fiber reinforced polymeric membrane is the orientation and alignment of the fibers. Preferably the reinforcing fibers are oriented at a non-zero and non-perpendicular angle relative to the direction of relative axial movement. The angular orientation of the continuous fibers relative to the direction of axial movement provides the advantages of greater strength and less friction as the surfaces of the fiber reinforced membrane axially slide across an oppositely facing surface in the loop configuration of the membrane. The orientation of alternative reinforcing materials (e.g. chopped fibers, whiskers, and platelets) is generally random, however, the advantages of greater strength and reduced thickness are still maintained.

Another feature of the presently disclosed reinforced polymeric membrane is the relative thickness of the membrane with respect to the thickness of the gap between the two sections of the vessel. As detailed herein, the present embodiment of the adjustable seal assembly contemplates a very thin membrane with a thickness ranging up to slightly less than 50 percent of the thickness of the small gap.

The above and other aspects, features, and advantages of the present invention will become more apparent from the following, more detailed description presented in conjunction with the accompanying drawings.

BRIEF DESCRIPTION OF THE DRAWINGS

In the following detailed description, reference will be made to the attached drawings in which.

Throughout the specification and various views of the drawings, like components are referred to with like reference numerals.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
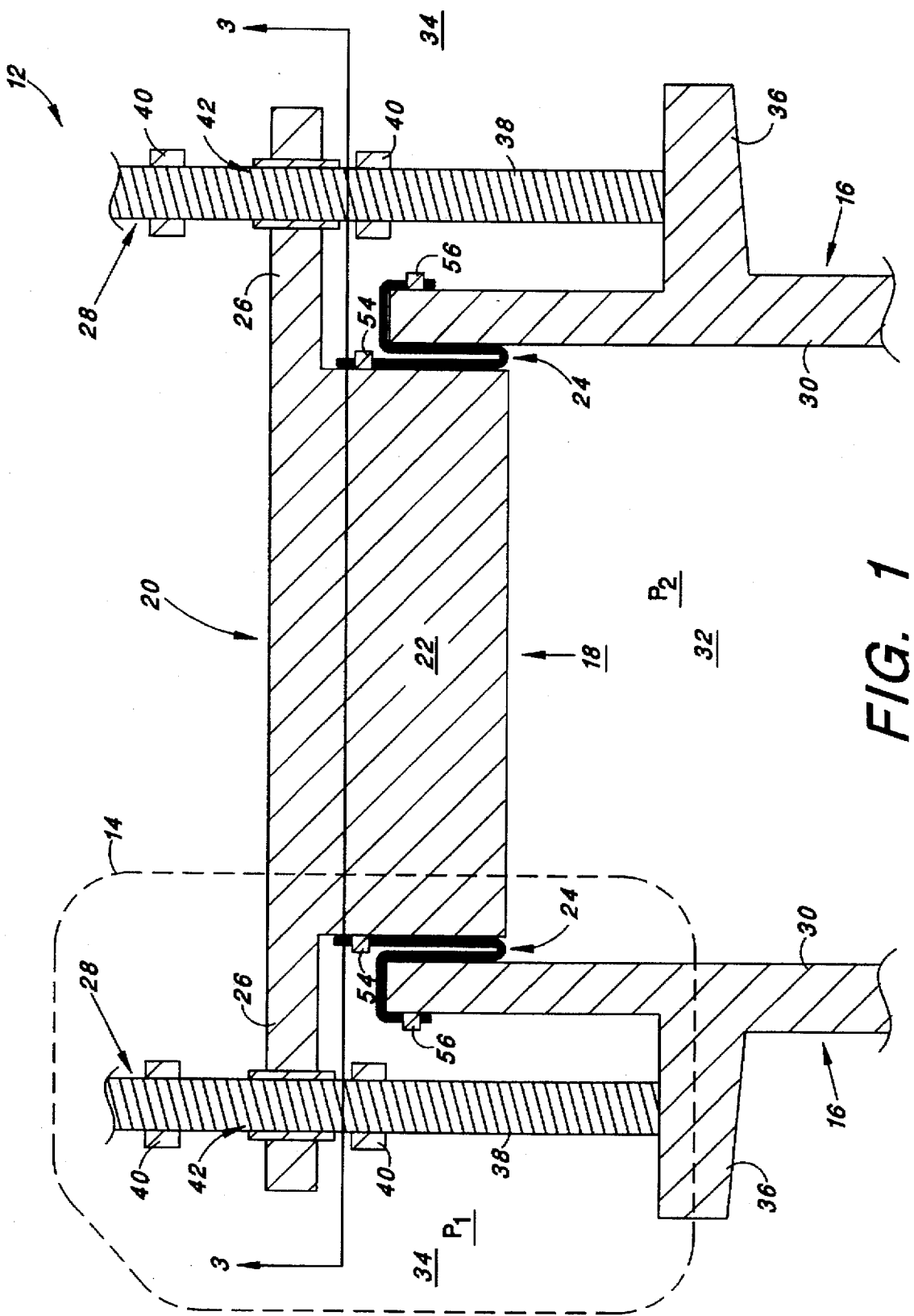
FIG. 1 is a side cross sectional view of a vessel incorporating the adjustable seal assembly in accordance with the present invention.
Figure 2:
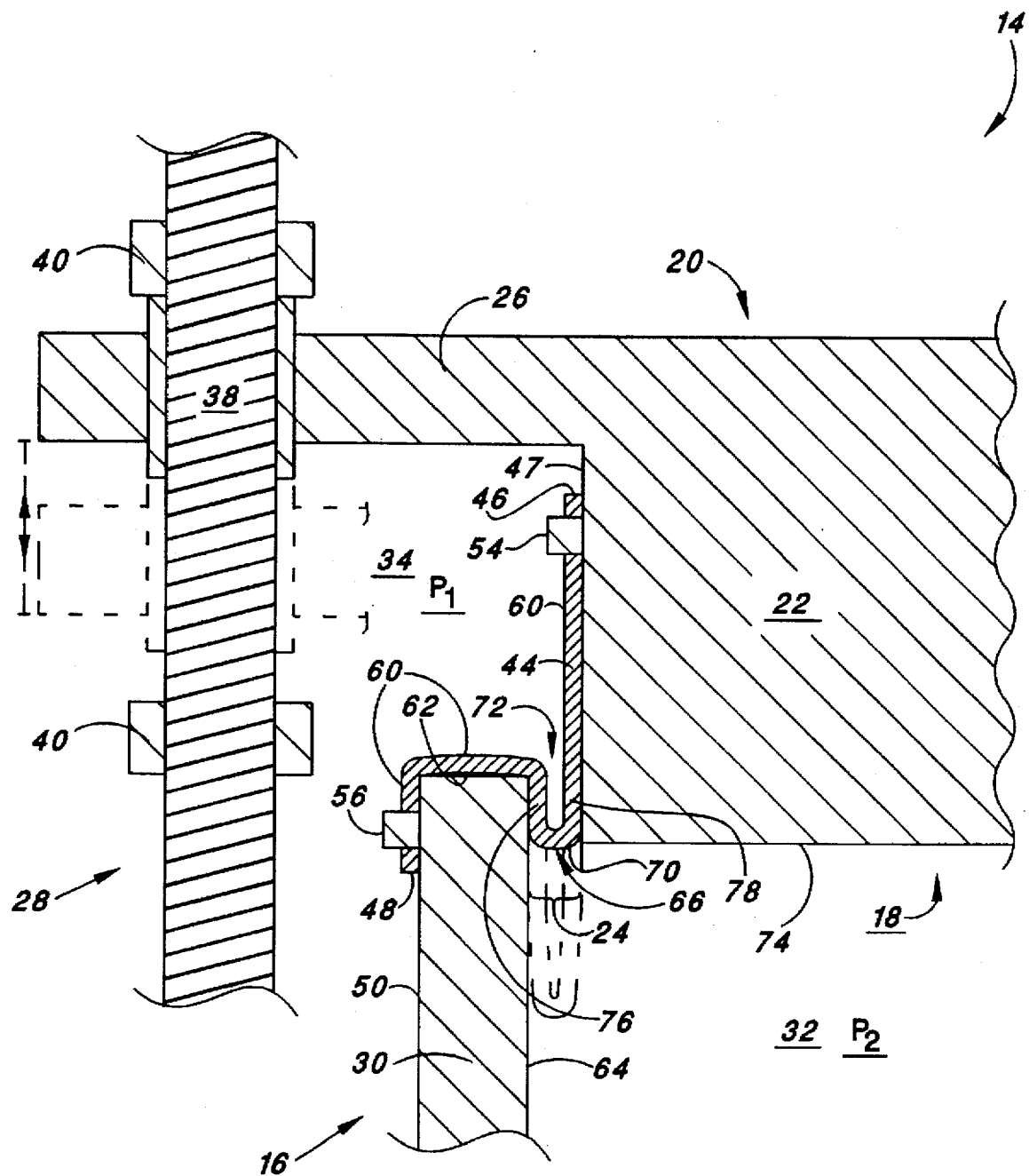
FIG. 2 is a partial side cross sectional view of the adjustable seal assembly of FIG. 1 illustrating the relative axial movement of vessel sections and corresponding movement of the adjustable seal assembly.

Referring now to the drawings and particularly FIGS. 1 and 2, there is shown two side cross sectional views of a vacuum vessel 12 incorporating the adjustable seal assembly 14. The vacuum vessel includes an outer chamber section 16 having an opening 18 and an inner lid or closure section 20. The lid 20 further includes a main body 22 which is adapted to fit within the opening 18 such that there is only a small gap 24 between the main body 22 of the lid 20 and the chamber section 16. In the illustrated embodiment, the lid 20 also includes a flange member 26 rigidly connected to the main body 22 and moveably engaged with various guide mechanisms 28. The chamber section 16 of the illustrated vessel 12 includes a plurality of chamber walls 30 which together with the main body 22 portion of the lid 20, situated in the opening 18, defines a low pressure ($P_2$) or vacuum chamber 32. The area outside the vacuum chamber 32 is referred to as the atmospheric or high pressure ($P_1$) portion 34 associated with the vessel 12. Some of the chamber walls 30 also include an external ledge 36 upon which the guide mechanisms 28 are mounted.

As seen in the illustrated embodiment, the adjustable seal assembly 14 includes guide mechanisms 28 moveably attached to the closure section 20 and rigidly attached to the chamber section 16 to allow relative axial motion between the outer chamber section 16 and the lid 20. The guide mechanisms 28 include a guide post 38 disposed in an axial orientation outside the vacuum chamber 32 and a pair of axial stop fixtures 40 disposed on the guide post 38. Each of the axial stop fixtures 40 are placed at preselected locations on the guide posts 38 and which are dimensioned to abut the flange member 26 of the lid 20 to prevent the relative axial movement beyond the stop fixtures 40. The amount of axial movement in the illustrated embodiment is limited by the spacing between the axial stops. FIGS. 1 and 2 illustrate the sections of the vessel 12 at a first and second axial position, respectively. FIG. 2 further depicts by the dashed line the relative axial movement of the adjustable seal assembly 14.

The guiding mechanisms 28 are driven by an actuating mechanism (not shown) which causes the lid or closure section 20 to move in an axial direction relative to guide post 38 and chamber section 16. The actuating mechanism can be any form of actuator including a screw drive mechanism wherein the guide post 38 is a threaded post which moves through a threaded bore 42 in the flange member 26. Alternatively, the actuating mechanism can include such devices as a pneumatic drive or hydraulic drive mechanism that imparts a drive force to the guide post 38 causing relative axial movement between the guide post 38 and the lid or closure section 20.

The illustrated embodiments of the adjustable seal assembly 14 also include a thin membrane 44 which forms a fluid-tight seal between the chamber section 16 and the lid or closure section 20. As described more fully below, the thin membrane 44 is preferably a reinforced polymeric membrane. A first edge 46 of the thin membrane is attached proximate to the outer surface 47 of the main body 22 and extends along the entire perimeter thereof. The opposite edge 48 of the thin membrane 44 is attached proximate to an outer surface 50 of the chamber walls 30 and is also disposed along the entire perimeter of the chamber section 16. More specifically, the thin membrane 44 is clamped to the outer surface 52 of the main body 22 of the lid 20 proximate the first edge 46 with a ring clamp 54 and also clamped to the outer surface 50 of the chamber section 16 near the second edge 48 with a second ring clamp 56. Although the illustrated embodiment uses a pair of ring clamps, 54 and 56, suitable alternative attachment methods, including adhesives, staples, rivets, and other forms of clamping devices are also contemplated.

As seen in the drawings, the flat body segment 60 of the thin membrane 44 between the two edges 46,48 extends over the end 62 of the chamber wall 30 along a portion of both the outer surface 50 and inner surface 64 of the chamber wall 30 and forms a loop configuration 66 within the gap 24 between the chamber section 16 and the lid 20. The flat body segment 60 of the thin membrane 44 further extends along the outer surface 52 of the lid or closure section 20. The overall width, w, of the thin membrane 44 between the first edge 46 and the second edge 48 is sufficient to accommodate the relative axial movement of the chamber section 16 and the lid 20 while preferably maintaining the loop configuration 66 of the membrane 44 at a specified location within the gap 24. The placement and attachment of the membrane edges 46,48 at the outer surfaces 50,52 of the chamber and lid sections of the vessel 12 is preferred because of the relative ease in which the thin membrane 44 can be removed and replaced. However, it is contemplated that the edge 48 of the thin membrane 44 can be attached to other surfaces of the chamber section 16 without adversely affecting the functionality of the adjustable seal assembly 14. Furthermore, the entire membrane need not be flat. Rather, only that portion of the membrane that is adapted to resides within the gap and form the loop configuration need be flat. Other portions or sections of the membrane may include various attachment or design features such as a ridge, shoulder, lip, etc.

An important feature in the illustrated embodiment is the general configuration of the loop. As seen in the drawings, the loop 66 has a U-shaped cross section with the closed end 70 preferably located in the gap 24 at a position closest to the low pressure or vacuum chamber 32 and in a convex orientation with respect to the low pressure or vacuum chamber 32. The open end 72 of the loop 66 is located proximate the end 62 of the chamber wall 30 and is exposed to the atmospheric or high pressure region 34. In this manner the membrane 44 retains the loop configuration 66 because of the pressure differential maintained across the membrane 44. During the relative axial movement of the illustrated embodiment, the pressure differential across the membrane 44 maintains the closed end 70 of the loop 66 at a position near the lower surface 74 of the lid 20 while the open end 72 of the loop 66 remains near the end 62 of the chamber wall 30. The sides 76,78 of the loop 66 appear to move with respect to one another creating a change in the axial dimensions of each side of the loop configuration 66. The overall width of the thin membrane 44, however, does not change.

Figure 3A:
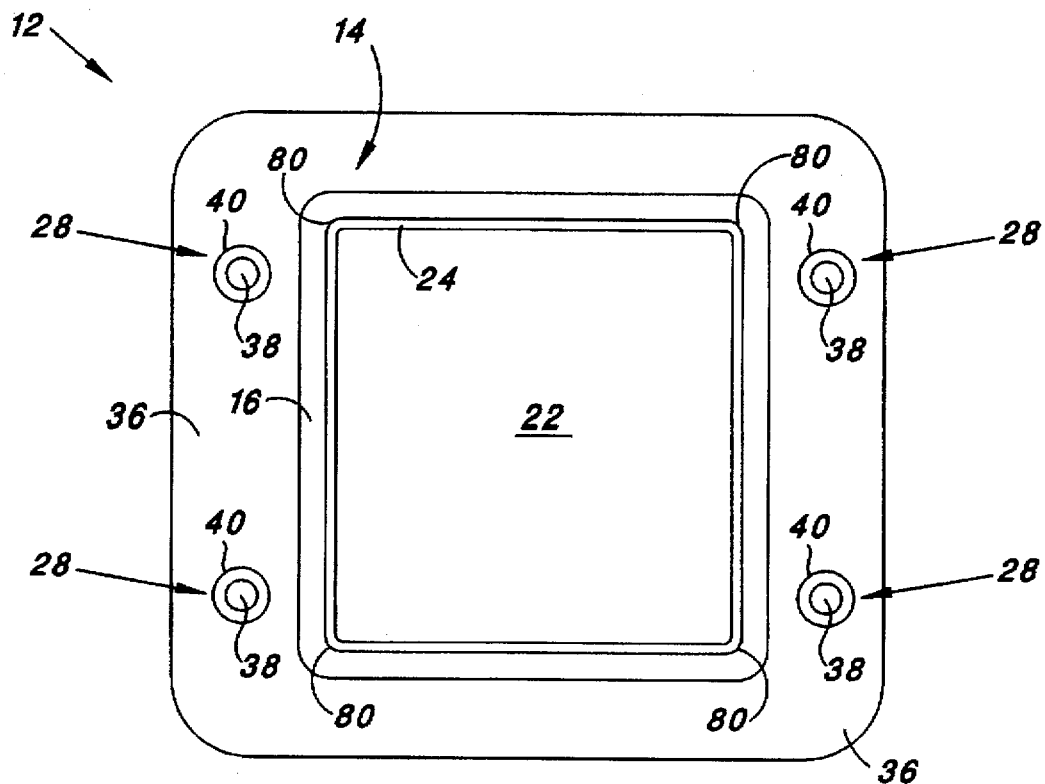
FIG. 3a is a sectional view of a vessel incorporating the adjustable seal assembly without the thin membrane taken along line 3—3 of FIG. 1.

Turning now to FIG. 3a, there is shown a top sectional view of the vessel incorporating the adjustable seal assembly. In FIG. 3a, the thin membrane is removed to more clearly illustrate the small gap between the various sections of the vessel. Unlike the related art devices, described above, the present adjustable seal assembly is particularly suitable for use in non-circular (e.g. rectangular) vessels. Rectangular seals or other non-circular seals have a tendency to bind or lock, especially near any corners 80 associated with the vessel 12. The adjustable seal assembly disclosed herein, however, overcomes these problems through the use of several guide mechanisms 28 which maintains the gap 24 between the vessel sections during the relative axial movement.

Figure 3B:
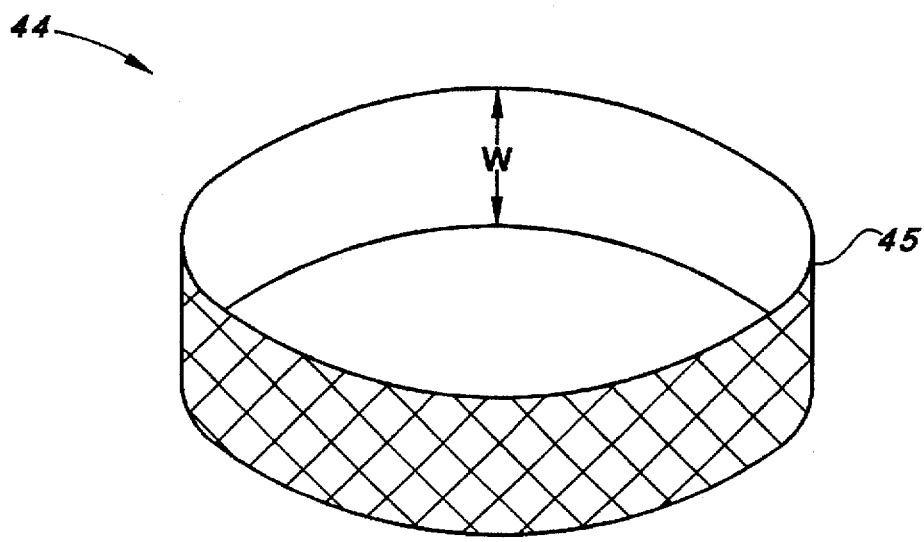
FIG. 3b is a perspective view of the thin membrane prior to installation within the adjustable seal assembly.

The exact location of the guide mechanisms 28 relative to the vessel 12 is not critical. What is important is that the guide mechanisms 28 ensure the gap 24 between the vessel sections remains a constant thickness (i.e. uniform thickness) at any given location during the axial movement. If the thickness of the small gap 24 remains uniform at each location, the thin reinforced membrane does not bind or lock. Another feature of the presently disclosed adjustable seal assembly is revealed in the shape of the thin membrane, as shown in FIG. 3b. Because the preferred embodiment of the membrane is made of a flexible polymeric material, the shape of the thin membrane need not be exactly matched with the dimensions or shape of the vessel sections in which it is used. For example, in the illustrated embodiments, the vessel is more or less a square shape with rounded corners 80. The flexible polymeric membrane 44, however, is formed as a single piece cylindrical strip 45 (i.e. without seams) having a circumference approximately equal to the perimeter length around the outer surface of the closure section. The flexible polymeric membrane is stretched to fit around the perimeter of the outer surface of the chamber section 16. As indicated above, the width, w, of the cylindrical strip polymeric membrane between the first edge and the second edge is selected to accommodate the relative axial movement of the vessel sections and to maintain the loop configuration of the membrane at a specified location within the gap 24.

Although the illustrated embodiment shows the use of the adjustable seal assembly in a generally square vessel with rounded corners having a uniform gap, the adjustable seal assembly is well suited for use in vessels of both circular and non-circular shapes. In addition, the present adjustable seal assembly is particularly adapted for use where there is a non-uniform or irregularly shaped gap between the moving sections of a vessel.

Figure 4:
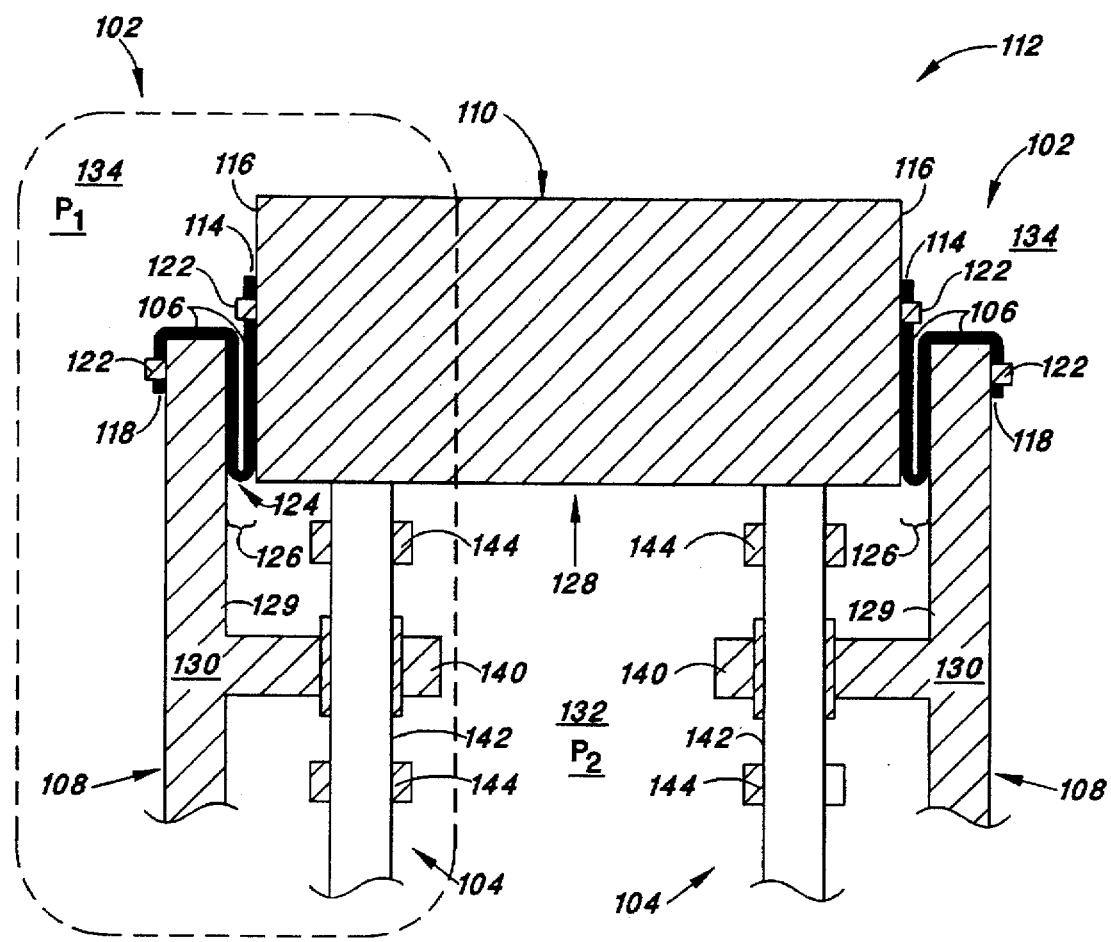
FIG. 4 is a side cross sectional view of another embodiment of a vessel incorporating the adjustable seal assembly in accordance with the present invention.

Turning now to FIG. 4, there is illustrated another embodiment of the adjustable seal assembly 102. As with the earlier described embodiment, the adjustable seal assembly 102 includes guide mechanisms 104 and a thin fiber reinforced polymeric membrane 106 which forms the fluid-tight seal between the chamber section 108 and the closure section 110 of a vacuum vessel 112. The first edge 114 of the fiber reinforced membrane 106 is clamped with a ring clamp 122 to the outer surface 116 of the closure section 110 and extends along the entire perimeter thereof. The second edge 118 of the fiber reinforced membrane 106 is also clamped to the outer surface 120 of the chamber section 108 using another ring clamp 122. As described above, the fiber reinforced membrane 106 forms a loop or U-shaped configuration 124 within the gap 126 between the chamber section 108 and the closure section 110 with the overall dimensions and shape of the membrane 106 being tailored to the shape of the vessel 112 and the extent of relative axial movement allowed.

The vacuum vessel 112 illustrated in FIG. 4 includes an outer chamber section 108 having an opening 128 and a closure section 110. The closure section 110 is dimensioned to fit within the opening 128 leaving only a small gap 126 between the outer surface 116 of the closure section 110 and the inner surface 129 of the chamber section 108. The chamber section 108 includes chamber walls 130 which together with the closure section 110 define boundaries of the vacuum or low pressure ($P_2$) chamber 132. As with the earlier described embodiment, the area outside the vacuum chamber 132 is referred to as the atmospheric or high pressure ($P_1$) area 134 associated with the vessel 112.

In the embodiment illustrated in FIG. 4, the chamber section 108 also includes one or more inwardly extending members 140 operatively connected with the guide mechanisms 104. In other words, the guide mechanisms 104 are moveably attached to the chamber section 108 and rigidly attached to the closure section 110 to allow relative axial motion between the chamber section 108 and the closure section 110. The relative axial movement between the two sections forms an adjustable boundary between the vacuum chamber 132 and the high pressure area 134 of the vessel 112. The adjustable seal assembly 102 maintains a fluid tight seal between the vacuum chamber 132 and the high pressure area 134 of the vessel 112 throughout the allowable axial movement of the two sections.

The guide mechanisms 104 include a guide post 142 disposed in an axial orientation inside the vacuum chamber 132 and also includes a pair of axial stop fixtures 144, 146 disposed on the guide post 142 at preselected locations. The amount of relative axial movement in the illustrated embodiment is limited by the spacing between the axial stops. The illustrated guide post 142 is a threaded post which moves through a threaded bore 146 in the extension member 140 using the closure section 110 to move in the axial direction and change the positioning of the adjustable seal (i.e. fiber reinforced membrane 106).

Figure 5A:
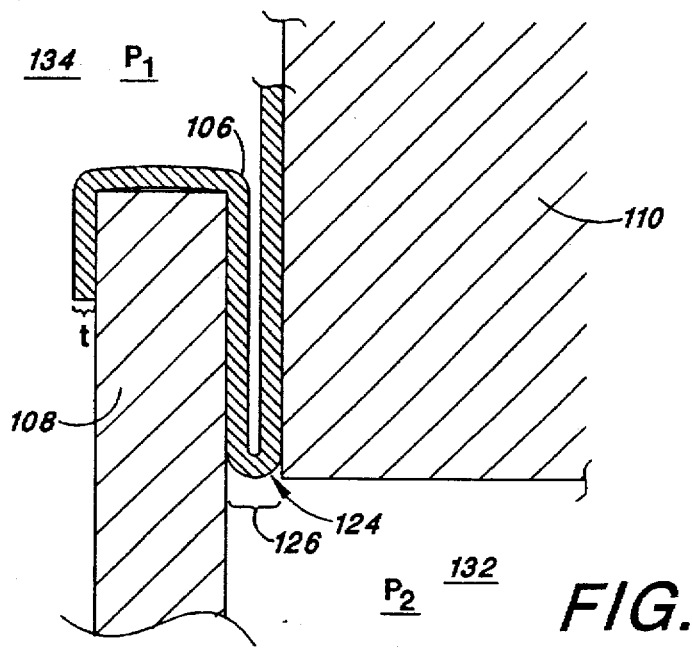
FIGS. 5a, 5b, and 5c are enlarged views of a portion of the fiber reinforced membranes suitable for use in the present adjustable seal assembly shown in FIG. 4.
Figure 5B:
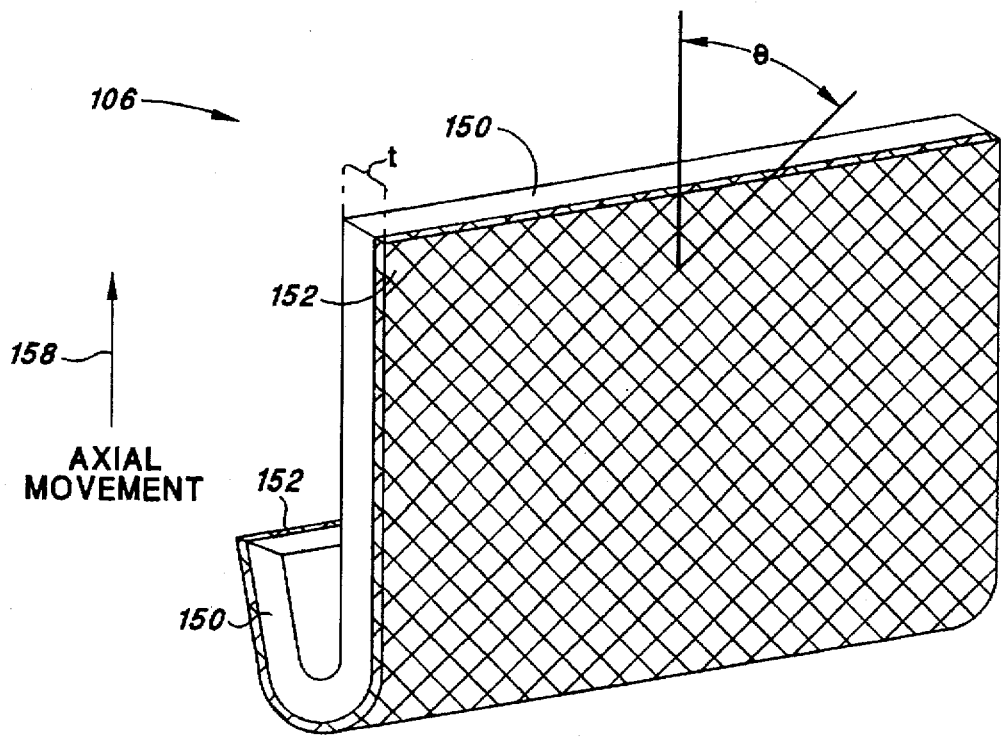
Figure 5C:
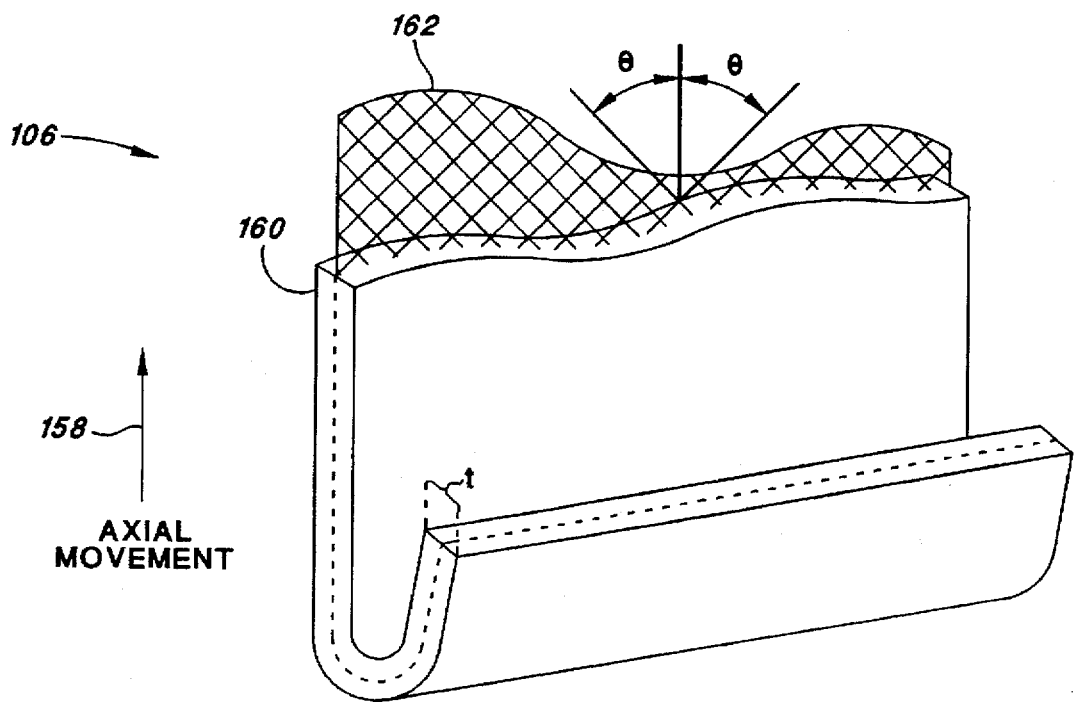

Turning now to FIGS. 5a, 5b, and 5c there is shown enlarged views of the fiber reinforced membranes 106 suitable for use in the above described embodiments. The fiber reinforced membrane 106 is a plastic or polymer based membrane that is sufficiently thin such that it is useful in applications where there is only a very small gap 126 between the chamber section 108 and the closure portion 110 of the vessel. In addition, the membrane 106 must be strong enough to form the fluid tight seal in a vacuum vessel or other environment where the pressure differential (i.e. $P_1$–$P_2$ in FIG. 5a) is relatively high. The strength of the membrane 106 is generally enhanced through the introduction of reinforcement into the membrane, the materials used for the membrane and the reinforcement, and the thickness of the membrane. In FIG. 5a, the illustrated membrane 106 has a thickness that is nearly 50% of the thickness, t, of the small gap 126.

The preferred membrane material is a high strength, flexible polymer that is impermeable to air, such as a polyethylene film, a polyaramide film, a polyurethane film, silicon film or similar such materials, having a thickness range of about 10 to 1000 μm, although thicker membranes can also be used. The selection of a fiber material for use as the fiber reinforcement is very much dependent on the application in which it is used. The contemplated fiber materials include fibers such as carbon fibers, carbide fibers, nylon fibers, glass fibers, metal oxide fibers, polyaramide fibers, or polyethylene fibers, although many other types of fiber reinforcement can be used. Advantageously, the broad choice of materials allows one to construct the adjustable seal assembly for very specialized applications, such as high purity environments, corrosive environments, high temperature environments, radioactive environments, etc. For example, adjustable seal assemblies that are non-activating and thus suitable for use in a high neutron flux environment are fabricated by using a carbon fiber reinforced polyethylene film as the thin membrane. In addition specialized fiber material, such as "self-lubricating" fibers (e.g. boron nitride) can be used to reduce frictional forces as part of the thin membrane slides past other portions of the thin membrane and the vessel surfaces. Further, the present adjustable seal assembly contemplates the use of other lubricants, e.g. molybdenum disulfide, graphite, etc., applied to the reinforced membrane to reduce frictional forces.

Referring next to FIGS. 5b and 5c, there is shown two of the contemplated fiber reinforced polymeric membranes. FIG. 5b depicts an embodiment of the fiber reinforced polymeric membrane 106 that includes a first layer of polymeric material 150 and a separate mesh or webbing 152 of reinforcement material disposed on the first layer of polymeric material 150. The reinforcing mesh or webbing 152 is preferably placed on the low pressure side of the polymeric membrane although alternative placement is possible. Advantageously, the continuous fibers that comprise the mesh or webbing 152 in FIG. 5b are oriented at an angle, θ, relative to the direction of axial movement. Orienting the fibers at a prescribed angle, θ, relative to the axial movement of the adjustable seal assembly tends to reduce the frictional forces encountered as the portion of the membrane adjacent to the closure section of the adjustable seal assembly slides past the portion of the membrane adjacent to the chamber section. In the illustrated embodiment, the flat mesh or webbing 152 includes a matrix of fibers generally oriented at about 45 degrees clockwise and counterclockwise from the direction of axial movement, indicated by arrow 158.

FIG. 5c depicts an alternate embodiment of the fiber reinforced polymeric membrane 106 that includes a unitary structure 160 of polymeric material formed on a mesh or webbing of fibers 162. Again, the fibers that comprise the mesh or webbing are preferably oriented at an angle θ, relative to the direction of axial movement. From a practical standpoint, the actual angle of orientation of the webbing or mesh fibers from the direction of axial movement can vary from about ±10 degrees to about ±80 degrees.

From the foregoing, it should be appreciated that the present invention thus provides an adjustable seal assembly using a fiber reinforced polymeric membrane for maintaining a fluid tight seal between moving sections in a vacuum vessel. While the present invention has been described in terms of preferred embodiments, it is to be understood that the invention is not to be limited to the exact form of the apparatus or processes disclosed. Rather, numerous modifications and variations can be made thereto by those skilled in the art without departing from the scope of the invention as set forth in the claims or sacrificing all its material advantages.

What is claimed is:

1. An adjustable seal assembly for maintaining a fluidtight seal between (a) a vessel having an opening leading to chamber means therewithin and (b) closure means proportioned to close the opening except for a gap between said closure means and said vessel, said vessel and said closure means being adapted to function in a vacuum environment and being constructed to accommodate relative motion between said closure means and said vessel when a vacuum exists on one side of the seal assembly, which seal assembly comprises:

a thin flexible membrane for sealing the gap between said closure means and said vessel when a vacuum environment exists on one side of the seal assembly;

means for attaching a first end of said flexible membrane to a surface of said closure means along a perimeter thereof;

means for attaching an opposite end of said flexible membrane to a surface of said vessel; and one or more guide mechanisms attached to said closure means and said vessel to guide the relative motion between said closure means and said vessel;

wherein said thin flexible membrane is designed so that a segment thereof generally forms a loop configuration in the region of said gap which permits the relative motion between said closure means and said vessel while maintaining the fluidtight seal.

2. A seal assembly according to claim 1 wherein said thin membrane is a reinforced polymeric membrane.

3. A seal assembly according claim 2 wherein said reinforced polymeric membrane includes a layer of polymeric material and a webbing of reinforcement material disposed on said layer of polymeric material.

4. A seal assembly according to claim 3 wherein said webbing of reinforcement material is formed of continuous fiber material.

5. A seal assembly according to claim 4 wherein said guide mechanisms permit relative movement only in a straight line and wherein said continuous fibers which form said reinforcement webbing are oriented at angles of about 45 degrees relative to the direction of relative movement.

6. A seal assembly according to claim 2 wherein said reinforced polymeric membrane is a reinforced polyethylene, a reinforced polyaramide, a reinforced polyurethane, or a reinforced silicone.

7. A seal assembly according to claim 6 wherein said reinforcement material is selected from the group consisting of carbon fibers, ceramic fibers, polyaramide fibers, fibers, glass fibers, metal oxide fibers and metal fibers.

8. A seal assembly according to claim 2 wherein said reinforced polymeric membrane includes a webbing of fiber reinforcement embedded within a surrounding sheet of polymeric material.

9. A seal assembly according to claim 8 wherein said webbing of reinforcement material is formed of continuous fiber material.

10. A seal assembly according to claim 9 wherein said guide mechanisms permit relative movement only in a straight line and wherein said continuous fibers which form said reinforcement webbing are oriented at angles between about 10 degrees and 80 degrees relative to the direction of relative movement.

11. A vessel which includes an chamber section having an opening leading to chamber means therewithin and inner closure means for closing the opening except for a gap between said closure means and said chamber section, said vessel being constructed to accommodate relative motion between said closure means and said chamber section, wherein the improvement comprises:

a seal assembly for maintaining a fluidtight seal at said gap which includes a thin flexible membrane having a first edge and an opposite edge, means for attaching said first edge to a surface of said closure means along a perimeter thereof, and means for attaching said opposite edge to a surface of said chamber section surrounding said opening so as to seal said gap between said closure means and chamber section; and one or more guide mechanisms fixedly attached to said chamber section and movably engaged with said closure means to guide relative motion therebetween in a straight line;

wherein said flexible membrane is disposed so that a segment of said flexible membrane generally forms a loop configuration within said gap which exists during said straight line relative motion between said closure means and said chamber section.

12. A vessel according to claim 11 wherein said closure means has a body portion which is received in said opening and forms said gap and wherein said opening and said body portion are coaxially disposed.

13. A vessel according to claim 12 wherein said opening and said closure means body portion are non-circular in cross section.

14. A vessel according to claim 12 wherein said opening and said closure means body portion are generally rectangular in cross section.

15. A vessel according to claim 12 wherein said first edge of said flexible membrane is attached to an axially extending surface of said closure means body portion and said opposite edge of said flexible membrane is attached to a surface of said chamber section which is exterior of said opening.

16. A vessel according to claim 15 wherein a pair of perimeter clamps secure said edges of said flexible membrane respectively to said chamber section exterior surface and to said axially extending body portion surface.

17. A vessel according to claim 12 wherein a plurality of said guide mechanisms align said body portion of said closure means within said opening to create said gap that is uniform in thickness, and wherein said flexible membrane has a thickness equal to between about 10 percent and slightly less than 50 percent of said thickness of said gap.

18. A vessel according to claim 17 wherein each of said guide mechanisms includes a guide post fixedly attached to an exterior surface of said chamber section of said vessel, said guide post being disposed in an axial orientation with respect to said opening, wherein said closure means is movably engaged with each of said guide posts so as to define said straight line axial movement of said closure means relative to said chamber section;

wherein a pair of axial stops are disposed on each said guide post, each of said axial stops being located at a preselected location to set the limits of axial movement of said closure means relative to said chamber section; and wherein said flexible membrane is tubular and has sufficient width to accommodate the axial movement of said closure means between the limits set by said axial stops while retaining said loop configuration within said gap.

19. A vessel which includes a chamber section having an opening leading to chamber means therewithin and closure means for closing the opening except for a gap between said closure means and said chamber section, said vessel being constructed to accommodate relative motion in a straight line between said closure means and said chamber section, wherein the improvement comprises:

a seal assembly for maintaining a fluidtight seal at said gap which includes a thin flexible membrane having a first edge and an opposite edge, means for attaching said first edge to a surface of said closure means along a perimeter thereof, and means for attaching said opposite edge to a surface of said chamber section surrounding said opening so as to seal said gap between said closure means and chamber section; and one or more guide mechanisms each of which include a first part fixedly attached to said closure means and movably engaged with a second part that is fixedly attached to said chamber section to guide relative motion therebetween in a straight line;

wherein said flexible membrane is disposed so that a segment of said flexible membrane generally forms a loop configuration within said gap during said straight line relative motion between said closure means and said vessel.

20. A vessel according to claim 19 wherein said closure means has a body portion which is received in said opening and forms said gap and wherein said opening and said body portion are coaxially disposed.

21. A vessel according to claim 20 wherein a plurality of said guide mechanisms align said body portion of said closure means within said opening to create said gap that is uniform in thickness, and wherein said flexible membrane has a thickness equal to between about 10 percent and slightly less than 50 percent of said thickness of said gap.

22. A vessel according to claim 21 wherein said guide mechanism first part is a guide post fixedly attached to said body portion of said closure means, said guide post being disposed in an axial orientation with respect to said opening and within said chamber means of said chamber section of said vessel, wherein said second part contains a bore within which said guide post is movably engaged so as to define said straight line axial movement of said closure means relative to said chamber section;

wherein a pair of axial stops are disposed on each said guide post, each of said axial stops being located at a preselected location to set the limits of axial movement of said closure means relative to said chamber section; and wherein said flexible membrane is tubular and has sufficient width to accommodate the axial movement of said closure means between the limits set by said axial stops while retaining said loop configuration within said gap.

* * * * *

UNITED STATES PATENT AND TRADEMARK OFFICE
CERTIFICATE OF CORRECTION

PATENT NO. : 5,667,224
DATED : September 16, 1997
INVENTOR(S) : Streckert, et al.

It is certified that error appears in the above-identified patent and that said Letters Patent is hereby corrected as shown below:

```
Column 5, line 16, change "52" to --47--;
         line 31, change "52" to --47--;
         line 38, change "50, 52" to --47, 50--; and
         line 46, change "resides" to --reside--.

Column 9, line 43 (claim 7), before "fibers" (4th
occurrence), insert --nylon--;
         line 58 (claim 11), change "an" (first
occurrence) to --a--;
         line 59, after "and", delete "inner"; and
         line 63, before "between", insert --in a
straight line--.
```

Signed and Sealed this

Seventeenth Day of March, 1998

Attest:

BRUCE LEHMAN

*Attesting Officer*  *Commissioner of Patents and Trademarks*